Feb. 26, 1952 G. L. GRUNDMANN 2,587,313

AUTOMATIC CONTROL OF WAVE FORM

Filed Sept. 23, 1948

INVENTOR
Gustave L. Grundmann
BY
[signature]
ATTORNEY

Patented Feb. 26, 1952

2,587,313

UNITED STATES PATENT OFFICE 2,587,313

AUTOMATIC CONTROL OF WAVE FORM

Gustave L. Grundmann, Westmont, N. J., assignor to Radio Corporation of America, a corporation of Delaware Application September 23, 1948, Serial No. 50,853

8 Claims. (Cl. 315—27)

The present invention relates to systems for maintaining a desired wave form, and, more particularly, but not necessarily exclusively, to a novel automatic control system which functions to maintain the desired form of an output wave. The system of the present invention is applicable generally to producing or transmitting sinusoidal or other wave shapes, but it is especially applicable to television deflection circuits. A television deflection circuit embodying the invention will automatically provide control of the linearity of the deflection wave. The size of the scanning raster appearing on a television image producing device may be adjusted without change in the desirable linearity of deflection by employing the present invention.

The principal object of the invention is to provide for wave form comparison in a novel way to obtain a wave form restoring effect.

Another object of the invention is to provide a novel system for deriving and employing a differential signal which is effective in accordance with the invention for maintaining the desired wave form of an output signal.

A further object of the invention is to provide a novel arrangement for automatically controlling the deflection circuits associated with a cathode ray tube.

Still another object of the invention is to provide a novel automatic control of the linearity of deflection of the electron beam in a cathode ray tube.

Other objections and advantages of the invention will, of course, become apparent and immediately suggest themselves to those skilled in the art to which the invention is directed from a reading of the following specification in connection with the accompanying drawings in which.

Figures 1, 2, 3, 4:
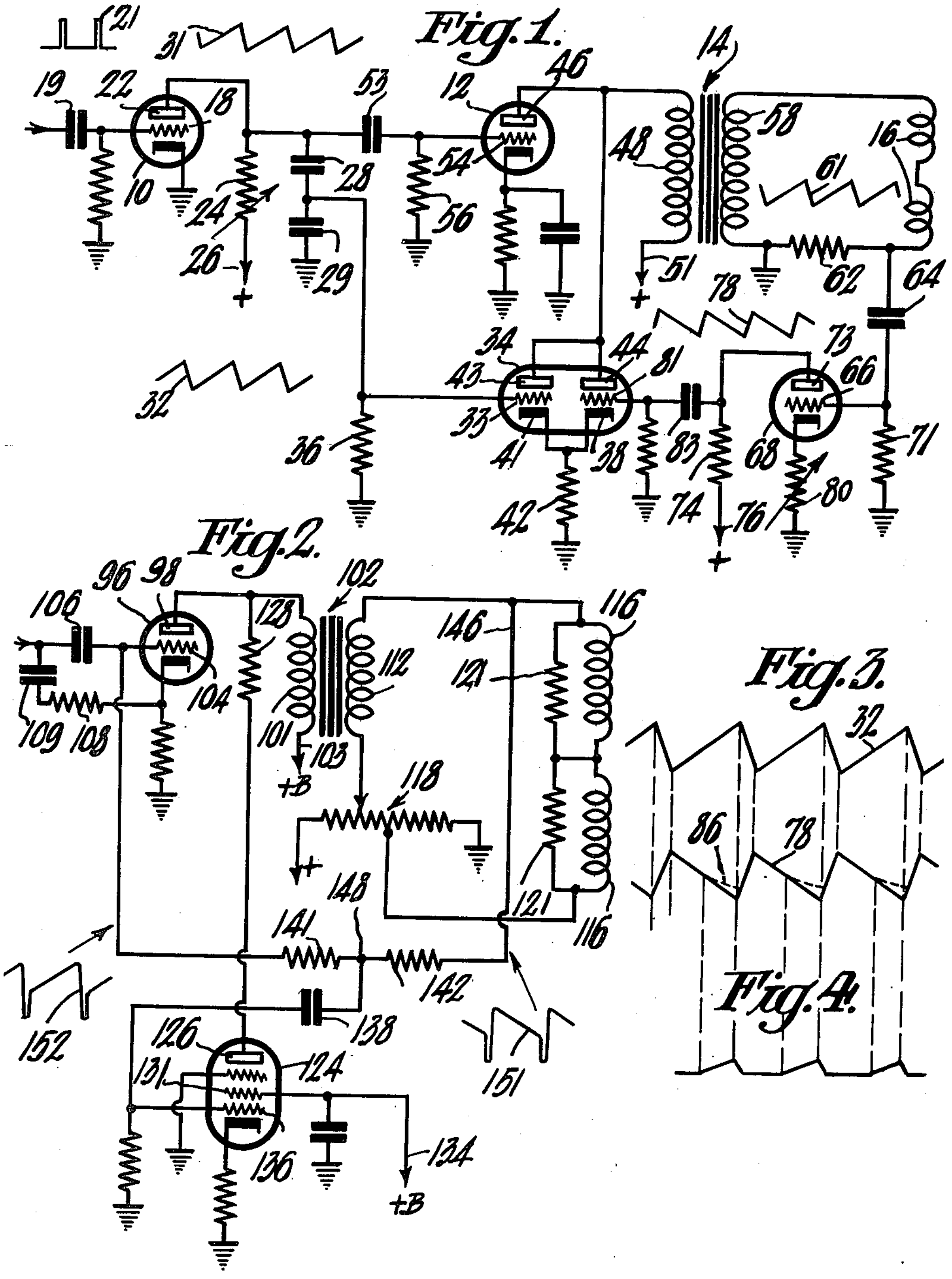
Fig. 1 shows, diagrammatically, cathode ray beam deflecting apparatus embodying the invention.
Fig. 2 is a diagrammatic showing of another embodiment of the invention.
Figs. 3 and 4 show wave forms to be referred to hereinafter in the description of apparatus embodying the invention.

Referring for the present to Fig. 1 of the drawing, there is shown, by way of example, a deflection circuit for deflecting the cathode ray beam of a cathode ray tube (not shown) along one axis, for example, the horizontal axis. Another similar deflection circuit (not shown) may be employed to produce deflection along an axis at right angles to the first axis thereby to produce a scanning raster in a well known manner. Arrangements, generally similar to that shown herein by way of example, are disclosed in Patent No. 2,101,520, granted December 7, 1937, to W. A. Tolson, and Tolson Reissue Patent No. Re. 20,338, dated April 30, 1937.

The deflection circuit selected by way of example as a convenient setting for the present invention, although the invention is not limited in use to circuits of this type, comprises a discharge tube 10, a power tube 12, a deflection transformer 14, and deflection coils 16. The coils 16 may be incorporated in a deflection yoke for use with a cathode ray tube (neither shown).

The grid 18 of the discharge tube 10 is connected through suitable coupling means shown as a condenser 19 to a source (not shown) of sharp pulses 21 of positive polarity. This source of pulses may be a blocking oscillator as shown in either Tolson patent, mentioned above.

The anode 22 of the discharge tube is connected through a charging resistor 24 to a suitable source of positive voltage (not shown) as indicated schematically at 26. The voltage supply source may be the usual B supply source generally associated with electronic equipment. Resistor 24 may be a height control.

Condensers 28 and 29 are charged in series with the resistor 24 from the connection 26, and tube 10 is substantially cut off. A sawtooth voltage will appear across either condenser 28 or 29 since these condensers are discharged periodically by the tube 10 on the occurrence of a pulse 21. The developed voltage wave is shown conventionally and is designated by reference character 31. The condenser combinations may be regarded as a voltage divider so that a portion of the sawtooth wave 31, shown conventionally and indicated by reference character 32 is applied to the grid 33 of one triode section of a dual triode 34. While a dual triode has been shown, it will be understood that other types of tubes as well as two separate tubes may be employed. The grid 33 is connected to ground through a grid resistor 36. The other triode section of the tube 34 includes a cathode 38 which is joined to the cathode 41. These cathodes are grounded through a common cathode resistor 42. The anode 43 which functions with the cathode 41 and the anode 44 which functions with the cathode 38 are connected to the anode 46 of the power tube 12. The anode of the power tube as well as the two anodes of the tube 34 are connected through the primary winding 48 of the deflection transformer 14 to a suitable source (not shown) of plate voltage as indicated schematically at 51.

The source of plate voltage may, as will be understood by those skilled in the art, be the same as the source connected to the previously mentioned terminal 26 for the discharge tube anode circuit.

The voltage wave developed as a result of the operation of the discharge tube 10 is applied through a coupling condenser 53 to the grid 54 of the power tube 12. The grid resistor 56 is provided for the grid 54. The wave form 31 which is applied to the grid 54 is suitable for the purpose of driving a sawtooth of current through the deflection coils 16 which are connected to the secondary 58 of the deflection transformer 14. In the foregoing, the wave form 31 is assumed to be a sawtooth voltage. However, it will be understood that this wave may take other forms depending upon the amount of inductance in the circuit, particularly with respect to the plate resistance of the tube 12. Normally for high-frequency deflection a sawtooth voltage 31 will serve to drive a sawtooth of current through the deflection coil 16. Irrespective of the wave form developed by the discharge tube 10, or other means corresponding thereto with which the invention is employed for wave shape maintaining purposes, this wave serves a comparison standard so that the deflection wave is made accurately to conform therewith in accordance with the invention.

A comparison wave 61 is developed across a resistor 62 which is in series with the current path through the deflection coils 16. This wave 61 is a voltage wave which is a replica of the wave form of the deflection current and, therefore, contains any irregularities or departures of the deflection current wave form from the desired wave form. One end of the resistor 62 is connected to ground to provide a ground return for the control circuit and the remaining end is coupled through a condenser 64 to the grid 66 of an amplifier tube 68. The grid 66 is connected to a grid resistor 71. The anode 73 of the tube 68 is connected through a load resistor 74 to a source of positive potential shown as indicated schematically at 76. The amplified and inverted voltage wave 78 is coupled to the grid 81 through a coupling condenser 83. The grid 81 functions as a control grid for the triode section of the tube 34 comprising the cathode 38 and the anode 44. It will be understood that if amplification is not considered desirable or necessary, then the wave 61 may be derived with the correct polarity from the resistor 62 and applied directly to the grid 81. It will be noted that the waves 32 and 78 are of opposite polarity. Resistor 80 sets the amplitude of 78.

Referring to Figs. 3 and 4 of the drawings, the operation of the system to maintain the correct wave form of current in the deflection coil 16 will now be described. It will be understood that the wave forms 32 and 78 are illustrative only and are not drawn to scale. The wave 78 will be assumed to become or tend to become non-linear as indicated by the dotted line 86. The difference voltage between the two waves 32 and 78 with the assumed distortion 86 will appear as shown in Fig. 4. When the waves 32 and 78 are identical or identical for all practical purposes, the tube sections of the dual diode 34 will each draw similar plate currents and there will be no change in effect on the operation of the power tube 12 as it functions to drive a sawtooth of current in the deflection coils 16. However, upon occurrence of any distortion of the wave 78 such as, for example, that indicated at 86, the two triode sections will be unbalanced with respect to their plate currents and a correction current will flow through the primary 48 proportional to the difference and this current is of such phase as to correct for non-linearity or other type of wave form distortion of the wave form which is sampled at 62.

Fig. 2 of the drawings shows another embodiment of the invention in which a single tube is employed to derive the correcting effect. In the arrangement of Fig. 2 an output tube 96 functions in a manner similar to that of the tube 12 described in connection with Fig. 1 of the drawings. The anode 98 of the tube 96 is connected through the primary 101 of a deflection transformer 102 to a suitable source (not shown) of positive voltage as indicated schematically by reference character 103. The grid 104 of the tube 96 is connected through a coupling condenser 106 to a resistor-condenser combination 108 and 109. The condenser 109 is charged in a manner similar to that of the condensers 28 and 29 of Fig. 1 and periodic discharge of the condenser 109 is affected by suitable means such as a discharge tube (not shown) which may correspond in function to the tube 10 of Fig. 1 of the drawings. The resistor 108 functions in a well known manner as a peaking resistor to provide an impulse component for a sawtooth wave which is applied to the grid 104. The purpose and function of the resistor 108 is by now well known to those skilled in the art. The secondary 112 of the deflection transformer 102 is connected across deflection coils 116 which may be part of a deflecting yoke structure for a cathode ray tube, neither of which are shown. The connection from the secondary 112 to the deflection coils 116 includes a centering device indicated generally by reference character 118 which is shown in the form of a potentiometer. Centering devices are well known to those skilled in the art and a further description is believed to be unnecessary. The coils 116 are or may be shunted by damping the resistor 121 which serve to damp oscillation in the deflection circuit during the retrace time of the cathode ray beam.

The tube 124, which is illustrated as being of the pentode type, has its anode 126 connected through a resistor 128 to the anode 98 of the tube 96. The tubes 96 and 124 may be considered as being connected in parallel for certain purposes to be described.

The screen grid 131 of the tube 124 is connected as indicated schematically at 134 to a suitable source (not shown) of positive voltage. The control grid 136 of this tube is connected by way of a coupling condenser 138 to the junction point of a pair of resistors 141 and 142 having similar values in the illustrative example. It will be understood that, in accordance with the invention, if the amplitudes of the waves 151 and 152 differ, the resistors 142 and 141 will have values inversely proportional to the amplitude of the respective wave. The remaining or free end of the resistor 141 is connected to the grid 104 of the tube 96 so that the wave form appearing thereon is applied effectively across the resistor 141, the junction point being in effect a floating ground. The free end of the resistor 142 is connected to the yoke 116 by way of a conductor 146.

A voltage corresponding in wave form to the wave form of the deflection current flowing in the coils 116 therefore appears across the resistor 142 as a wave of voltage, since the deflection system is resistance controlled.

From what has been stated previously in connection with Fig. 1, it will be seen that if the wave forms of the voltages applied to the free-terminals of resistors 141 and 142 are equal, the potential at the point 148 will remain substantially fixed and the plate current of the tube 124 will remain in a steady state condition. If the wave form shown conventionally as indicated by the reference character 151 changes with respect to the wave form 152 appearing at the grid 104 of the tube 96, the potential applied to the grid 136 of the tube 124 will shift in a direction to change the conductivity of the tube 124 in such a way as to correct the distortion.

Solely, by way of example, the tube 124 may be a type 6AC7 tube. The tube 96 may consist of the two sections of a 6SN7GT tube interconnected together. Resistor 108 may have a value of 3900 ohms. Condenser 109 may have a value 0.1 microfarad. Resistor 141 may have a value in a neighborhood of 1.8 megohms. Resistor 142 may have a value in the neighborhood of 1 megohm. These values are given solely by way of example in connection with an arrangement in accordance with the invention which performs to provide a wave 151 which was substantially a replica of the wave 152.

The invention claimed is:

1. A system for maintaining a desired wave form comprising an electric wave source, a utilization circuit for said wave, a wave comparison device, means for applying an electric wave from said wave source to said comparison device, means for applying a wave from said utilization circuit to said comparison device in opposite phase relationship to the wave applied from said wave source and of substantially the same amplitude, said comparison device having means for deriving a differential effect, and means for applying said differential effect to said utilization circuit to offset a departure in the waveform appearing in said utilization device from the waveform supplied by said electric wave source.

2. A system for maintaining a desired wave form comprising an electric wave source, utilization apparatus operating under control of said wave, an electronic tube having at least a cathode, an anode and a control electrode, an anode circuit for said anode, means for coupling said anode circuit to said utilization device, a wave comparison device, means for applying an electric wave from said wave source to said comparison device, means for applying a wave from said utilization apparatus to said comparison device in opposite phase relationship to the wave applied from said wave source and of substantially the same amplitude, said comparison device having means for deriving a differential effect, and means for applying said differential effect to the anode circuit of said tube.

3. A system for maintaining a desired wave form comprising an electric wave source, a utilization circuit for said wave, a wave comparison device comprising electronic tube means, a pair of electrodes associated with said tube means, each electrode being effective to control current flow through said tube means, means for applying an electric wave from said wave source to one of said electrodes, means for applying a wave from said utilization circuit to the other of said electrodes in opposite phase relationship to the wave applied from said wave source and of substantially the same amplitude, said comparison device having means for supplying a differential effect, and means for applying said differential effect to said utilization circuit.

4. A system for maintaining a desired wave form comprising an electric wave source, a utilization circuit for said waves, a wave comparison device comprising a pair of electronic tubes, each tube having a control electrode, a cathode and an anode, said cathodes and said anodes being electrically joined, means for applying an electric wave from said wave source to one of said control electrodes, means for applying a wave from said utilization circuit to the other of said electrodes in opposite phase relationship to the wave applied from said wave source and of substantially the same amplitude, said comparison device having means for supplying a differential effect, and means for applying said differential effect to said utilization circuit.

5. A system for maintaining a desired wave form comprising an electric wave source, a utilization circuit for said wave, a wave comparison device comprising an electronic tube, said tube having at least a cathode, an anode, and an electrode effective to control current flow through said tube, a resistor, means for applying an electric wave from said wave source to said electrode through said resistor, a second resistor, means for applying a wave through said second resistor from said utilization circuit to said electrode in opposite phase relationship to the wave applied from said wave source, said tube supplying a differential effect upon a variation in wave form in said wave applied from said utilization circuit, and means for applying said differential effect to said utilization circuit.

6. A deflection system for deflecting the cathode ray beam of a cathode ray tube comprising a sawtooth wave generator, a deflection coil, a driver tube controlled by said generator for driving a beam deflecting current through said coil, means for coupling said tube to said coil, a wave comparison device comprising electronic tube means, a pair of electrodes associated with said tube means, each electrode being effective to control current flow through said tube means, means for applying an electric wave from said sawtooth wave generator to one of said electrodes, means for obtaining a voltage wave representation of the current wave in said coil, means for applying the obtained voltage wave to the other of said electrodes in opposite phase relationship to the wave applied from said wave generator, said comparison device having means for supplying a differential effect, and means for applying said differential effect to the output of said driver tube.

7. A deflection system for deflecting the cathode ray beam of a cathode ray tube comprising a sawtooth wave generator, a deflection coil, a driver tube controlled by said generator for driving a beam deflecting current through said coil, means for coupling said tube to said coil, a wave comparison device comprising an electronic tube, a control electrode for said tube, means including a resistor for applying an electric wave from said sawtooth wave generator to said control electrode, a connection to said coil including a second resistor for applying a voltage wave representing the current wave in said coil to said control electrode in opposite phase relationship to the wave applied from said wave generator, said comparison device having means for supplying a differential effect, and means for applying said differential effect to the output of said driver tube.

8. A deflection system for deflecting the cathode ray beam of a cathode ray tube comprising a sawtooth wave generator, a deflection coil, a driver tube controlled by said generator for driving a beam deflecting current through said coil, means for coupling the output circuit of said tube to said coil, a wave comparison device comprising an electronic tube, a control electrode for said tube, means including a resistor for applying an electric wave from said sawtooth wave generator to said control electrode, a connection to said coil including a second resistor for applying a voltage wave representing the current wave in said coil to said control electrode in opposite phase relationship to the wave applied from said wave generator, said comparison device having means for supplying a differential effect, and a connection to the output circuit of said driver tube for applying said differential effect effectively in parallel with the output circuit of said driver tube.

GUSTAVE L. GRUNDMANN.

REFERENCES CITED

The following references are of record in the file of this patent:

UNITED STATES PATENTS

| Number | Name | Date |
|---|---|---|
| 2,230,819 | White | Feb. 4, 1941 |
| 2,251,851 | Moore | Aug. 5, 1941 |
| 2,414,546 | Nagel | Jan. 21, 1947 |